US012663497B2

(12) United States Patent     (10) Patent No.:   US 12,663,497 B2

Shiina et al.          (45) Date of Patent:     Jun. 23, 2026

(54) COMMUNICATION SYSTEMS, CONTROLS, CONTROL METHODS, AND PROGRAMS

(71) Applicant: NTT, Inc., Tokyo (JP)

(72) Inventors: Ryota Shiina, Musashino (JP); Shinya Tamaki, Musashino (JP); Tomohiro Taniguchi, Musashino (JP)

(73) Assignee: NTT, Inc., Tokyo (JP)

( * ) Notice: Subject to any disclaimer, the term of this patent is extended or adjusted under 35 U.S.C. 154(b) by 246 days.

(21) Appl. No.: 18/717,550

(22) PCT Filed: Dec. 21, 2021

(86) PCT No.: PCT/JP2021/047198

§ 371 (c)(1),
(2) Date: Jun. 7, 2024

(87) PCT Pub. No.: WO2023/119395

PCT Pub. Date: Jun. 29, 2023

(65) Prior Publication Data

US 2025/0052848 A1     Feb. 13, 2025

(51) Int. Cl.
    *H04B 10/00*        (2013.01)
    *G01S 1/70*         (2006.01)
          (Continued)

(52) U.S. Cl.
    CPC ................ *G01S 1/70* (2013.01); *G16Y 40/30* (2020.01); *G16Y 40/60* (2020.01)

(58) Field of Classification Search
    CPC ... H04B 10/11; H04B 10/114; H04B 10/1143; H04B 10/1149; H04B 10/116; G01S 5/0036; G01S 5/16
    See application file for complete search history.

(56) References Cited

U.S. PATENT DOCUMENTS

| | | | |
|---|---|---|---|
| 2018/0235049 A1* | 8/2018 | Montagne | ............ G01C 21/206 |
| 2022/0132015 A1* | 4/2022 | Oshima | ............... H04B 10/516 |
| 2022/0256406 A1* | 8/2022 | Van Wageningen | ........................ H04B 10/1149 |

OTHER PUBLICATIONS

[No Author Listed], "JJ-300.00 HTIP: Home-network Topology Identifying Protocol," The Telecommunication Technology Committee, TTC Standard Version 3.0, May 2017, 104 pages (with machine translation).

(Continued)

*Primary Examiner* — Daniel G Dobson
(74) *Attorney, Agent, or Firm* — Fish & Richardson P.C.

(57) ABSTRACT

An object of the present invention is to provide a communication system, a control device, a control method, and a program that can inexpensively acquire highly reliable sensor data. A communication system according to the present invention includes a control device, a plurality of lighting devices, and an IoT device. The lighting devices output modulated light beams that are modulated, the IoT device receives each of the modulated light beams, uses information obtained from each of the modulated light beams as metadata, and transmits, to the control device, the metadata and collected sensing data in association with each other, and the control device controls generation and output of the modulated light beams to the lighting devices, estimates a position of the IoT device from the metadata, and stores the position of the IoT device and the sensing data in association with each other.

6 Claims, 8 Drawing Sheets

(51) Int. Cl.
    *G16Y 40/30*         (2020.01)
    *G16Y 40/60*         (2020.01)
    *H04J 14/00*         (2006.01)

(56)                References Cited

OTHER PUBLICATIONS

[No Author Listed], "IEEE Standard for Local and metropolitan area networks—Station and Media Access Control Connectivity Discovery," IEEE Computer Society, IEEE Std 802.1AB™-2016, Jan. 2016, 146 pages.

Kudou et al., "The Proposal of Indoor Positioning System Using Nearest Beacon," Information Processing Society Research Report, Dec. 2015, 2015-MBL-77(23): 1-6, 13 pages (with machine translation).

* cited by examiner

Fig. 8

(A)     Table 9-33—Probe Request frame body *(continued)*

| Order | Information | Notes |
|---|---|---|
| 19 | Extended Request | The Extended Request element is optionally present if dot11RadioMeasurementActivated is true. |
| Last | Vendor Specific | One or more vendor-specific elements are optionally present. These elements follow all other elements. |

EXP (B)     Table 9-34—Probe Response frame body *(continued)*

| Order | Information | Notes |
|---|---|---|
| 64 | Quiet Channel | Either one Quiet Channel element containing an AP Quiet Mode field equal to 0 or, in an infrastructure BSS, one or more Quiet Channel elements each containing an AP Quiet Mode field equal to 1 are optionally present if dot11VHTOptionImplemented is true, and either dot11SpectrumManagementRequired or dot11RadioMeasurementActivated is true. |
| 65 | Operating Mode Notification | The Operating Mode Notification element is optionally present if dot11OperatingModeNotificationImplemented is true. |
| 66 | Reduced Neighbor Report | The Reduced Neighbor Report element is optionally present if dot11TVHTOptionImplemented is true. |
| 67 | TVHT Operation | The TVHT Operation element is present for a TVHT STA when the dot11TVHTOptionImplemented is true; otherwise it is not present |
| 68 | Estimated Service Parameters | The Estimated Service Parameters element is optionally present if dot11EstimatedServiceParametersOptionImplemented is true. |
| 69 | Relay Capabilities | The Relay Capabilities element is present if dot11RelayActivated is true, otherwise not present. |
| Last-1 | Vendor Specific | One or more vendor-specific elements are optionally present. These elements follow all other elements, except the Requested elements. |
| Last | Requested elements | Elements requested by the Request element or Extended Request element(s) of the Probe Request frame are present if dot11MultiDomainCapabilityActivated or dot11EstimatedServiceParametersOptionImplemented is true. See 11.1.4.3.2 and 11.46. |

EXP

COMMUNICATION SYSTEMS, CONTROLS, CONTROL METHODS, AND PROGRAMS

CROSS-REFERENCE TO RELATED APPLICATIONS

This application is a National Stage application under 35 U.S.C. § 371 of International Application No. PCT/JP2021/047198, having an International Filing Date of Dec. 21, 2021, the disclosure of which is considered part of the disclosure of this application, and is incorporated by reference in its entirety into this application.

TECHNICAL FIELD

The present disclosure relates to a communication system for the Internet of Things (IoT), a control device for controlling the same, a control method thereof, and a program thereof.

BACKGROUND ART

IoT devices such as sensors are widely spread and are being applied to various industries. In utilizing IoT devices for various applications, the reliability of sensor data acquired by sensors is particularly important. In the process of collecting, analyzing, and utilizing sensor data, in particular, at the time of sensor data collection (including the time of installation of an IoT device), a decrease in reliability of the sensor data is likely to occur. In particular, the placement location (measurement location) of the IoT device is an important factor for supporting the reliability of sensor data. For example, when an installation error occurs due to an installer of the IoT device, or when the IoT device is moved to another place by a malicious person, a user of the sensor data may use the data without noticing that the data has an error and an erroneous result may be caused. Therefore, a technique for "visualizing" the position and movement of IoT devices is required.

As a technique for "visualizing" the position and movement of IoT devices, for example, there is a technique disclosed in NPL 1.

CITATION LIST

Non Patent Literature

[NPL 1] Daiki Kudou, Mitsuyoshi Horikawa, Tatsuya Furu-date, and Asuma Okamoto, "The Proposal of Indoor Positioning System Using Nearest Beacon," IPSJ SIG Technical Report, vol. 2015-MBL-77, No. 23, pp. 1-6, November 2015.

SUMMARY OF INVENTION

Technical Problem

NPL 1 discloses a technique of deploying a Bluetooth Low Energy (BLE) beacon in a space where a measurement object terminal is placed, measuring a received signal strength indicator (RSSI) of the BLE beacon received by the measurement object terminal, and ascertaining a position in space from the measurement result.

In order to apply the technique of NPL 1 to an IoT communication system, it is necessary to deploy a plurality of BLE beacons in advance in a space where a measurement object terminal (IoT device) is placed, and to allow the IoT device to receive the BLE beacon.

That is, when trying to enhance the reliability of sensor data by ascertaining the position of an IoT device using the technique of NPL 1, the following problems occur.

(1) A plurality of BLE beacons are installed in a space, and an IoT device capable of receiving the BLE beacons is prepared to construct a new system, which results in a large cost.

(2) Accurate positioning becomes difficult due to movement or loss of beacons, which incurs management costs for managing BLE beacons.

Therefore, in order to solve the above-described problems, an object of the present invention is to provide a communication system, a control device, a control method, and a program that can inexpensively acquire highly reliable sensor data.

Solution to Problem

In order to achieve the above object, a communication system according to the present invention is configured to receive a modulated light beam from an IoT lighting device by an IoT device on which an illuminance sensor or a camera is mounted, and to estimate a position of the IoT device by a control device from the result.

Specifically, a communication system according to the present invention is a communication system including a control device, a plurality of lighting devices, and an Internet of Things (IoT) device, in which the lighting devices output modulated light beams that are modulated, the IoT device receives each of the modulated light beams, uses information obtained from each of the modulated light beams as metadata, and transmits, to the control device, the metadata and collected sensing data in association with each other, and the control device controls generation and output of the modulated light beams to the lighting devices, estimates a position of the IoT device from the metadata, and stores the position of the IoT device and the sensing data in association with each other.

In addition, a control device according to the present invention is a control device that controls a communication system including a plurality of lighting devices and an Internet of Things (IoT) device, in which the lighting devices output modulated light beams that are modulated, the IoT device receives each of the modulated light beams, uses information obtained from each of the modulated light beams as metadata, and transmits the metadata and collected sensing data in association with each other, and the control device controls generation and output of the modulated light beams to the lighting devices, estimates a position of the IoT device from the metadata received from the IoT device, and stores the position of the IoT device and the sensing data in association with each other.

Further, a control method according to the present invention is a control method for controlling a communication system including a plurality of lighting devices and an Internet of Things (IoT) device, the method including:

outputting modulated light beams that are modulated from the lighting devices;

receiving each of the modulated light beams by the IoT device;

using information obtained from each of the modulated light beams by the IoT device as metadata, and transmitting the metadata and collected sensing data in association with each other from the IoT device;

controlling generation and output of the modulated light beams to the lighting devices;

estimating a position of the IoT device from the metadata; and storing the position of the IoT device and the sensing data in association with each other.

The present invention is characterized in that an acquisition position of sensing data collected by an IoT device unit and a position management of the IoT device unit are performed by using a system including an IoT lighting device and an illuminance sensor attached to the IoT device.

In the IoT lighting device, a modulation pattern of a specific period optically modulated in a period of such a degree that cannot be perceived by a person is repeatedly transmitted from the light source. The optical modulation in a period of such a degree that cannot be perceived by a person is, for example, to reduce the degree of optical modulation or to increase the modulation period so that the person cannot perceive it. Note that by setting a different modulation pattern for each IoT lighting device, it is possible to determine from which IoT lighting device the light is received.

The IoT device unit receives modulation patterns from each IoT lighting device simultaneously or separately via an illuminance sensor, uses information (for example, pattern arrangement, frequency, etc.) related to the received modulation patterns as metadata, and transmits, to the control device, the metadata and sensing data in association with each other.

The control device separates the collected sensing data and the metadata, and estimates the position of the IoT device unit using the metadata. The control device stores the estimated position information in a database as a set with sensing data and manages it.

For example, the control device outputs the modulated light beams different for each of the lighting devices, estimates a distance between each of the lighting devices and the IoT device from a light intensity of each of the modulated light beams received by the IoT device, and estimates the position of the IoT device from the distance.

By introducing a position estimation mechanism using IoT lighting device in addition to the sensing data, metadata (position information) when acquiring the sensing data can be managed in a set, and the reliability of the sensing data can be enhanced. In addition, in position estimation, highly accurate position estimation can be performed simply by attaching an inexpensive illuminance sensor or camera to a device without modifying existing IoT illumination.

Accordingly, the present invention can provide a communication system, a control device, and a control method that can inexpensively acquire highly reliable sensor data.

The present invention is a program causing a computer to function as the management control device. The data collection device of the present invention can also be implemented by a computer and a program, and the program can be recorded on a recording medium or provided through a network.

The above inventions can be combined whenever possible.

Advantageous Effects of Invention

The present invention can provide a communication system, a control device, a control method, and a program that can inexpensively acquire highly reliable sensor data.

BRIEF DESCRIPTION OF DRAWINGS

FIG. 8 is a diagram illustrating an example of storing metadata in a control system frame.

DESCRIPTION OF EMBODIMENTS

Figure 1:
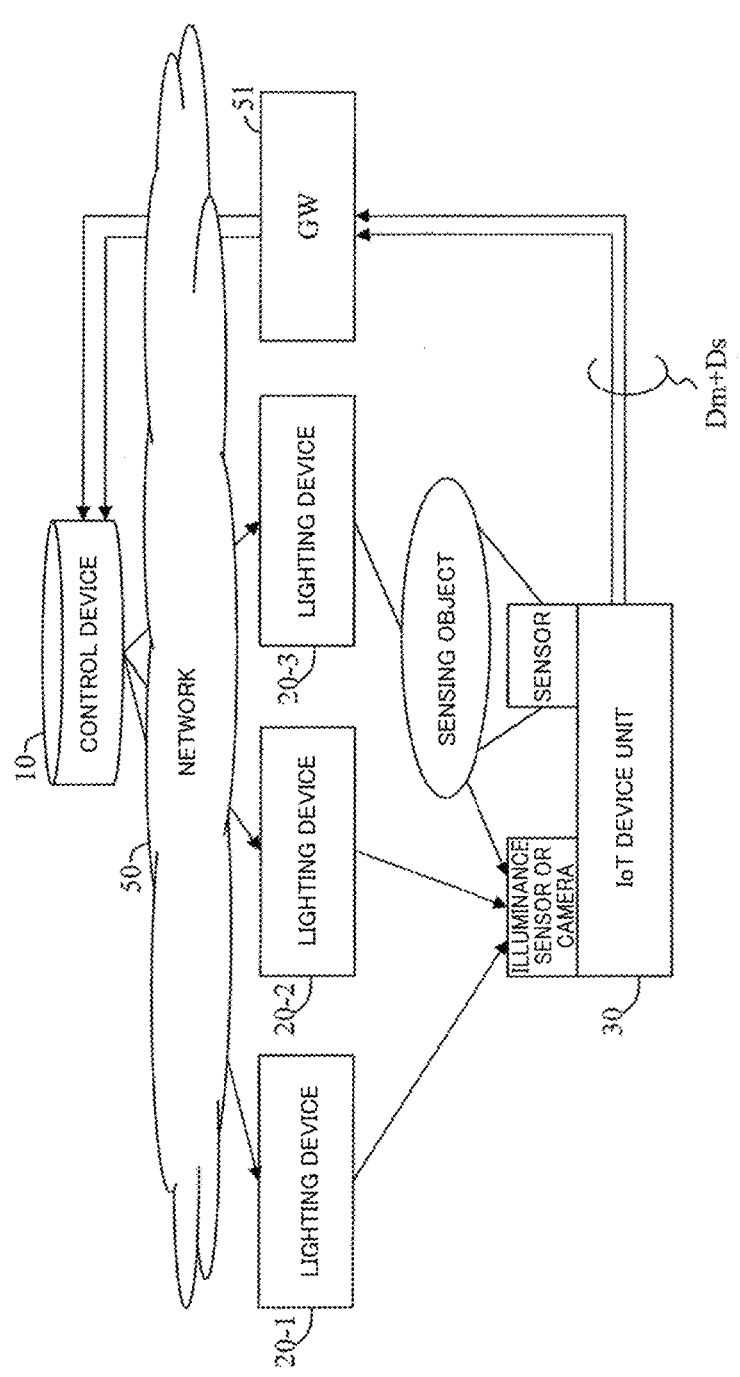
FIG. 1 is a diagram illustrating a communication system according to the present invention.

Embodiments of the present invention will be described with reference to the accompanying drawings. The embodiments described below are examples of the present invention, and the present invention is not limited to the following embodiments. Note that, in the present specification and the drawings, components having the same reference numerals indicate the same components.

Embodiment 1

FIG. 1 is a diagram illustrating a communication system 301 of the present embodiment. The communication system 301 includes a control device 10, a plurality of lighting devices 20, and an Internet of Things (IoT) device 30.

The lighting devices 20 output modulated light beams that are modulated, the IoT device 30 receives each of the modulated light beams, uses information obtained from each of the modulated light beams as metadata Dm, and transmits, to the control device 10, the metadata Dm and collected sensing data Ds in association with each other, and the control device 10 controls generation and output of the modulated light beams to the lighting devices 20, estimates a position of the IoT device 30 from the metadata Dm, and stores the position of the IoT device 30 and the sensing data Ds in association with each other.

Figure 2:
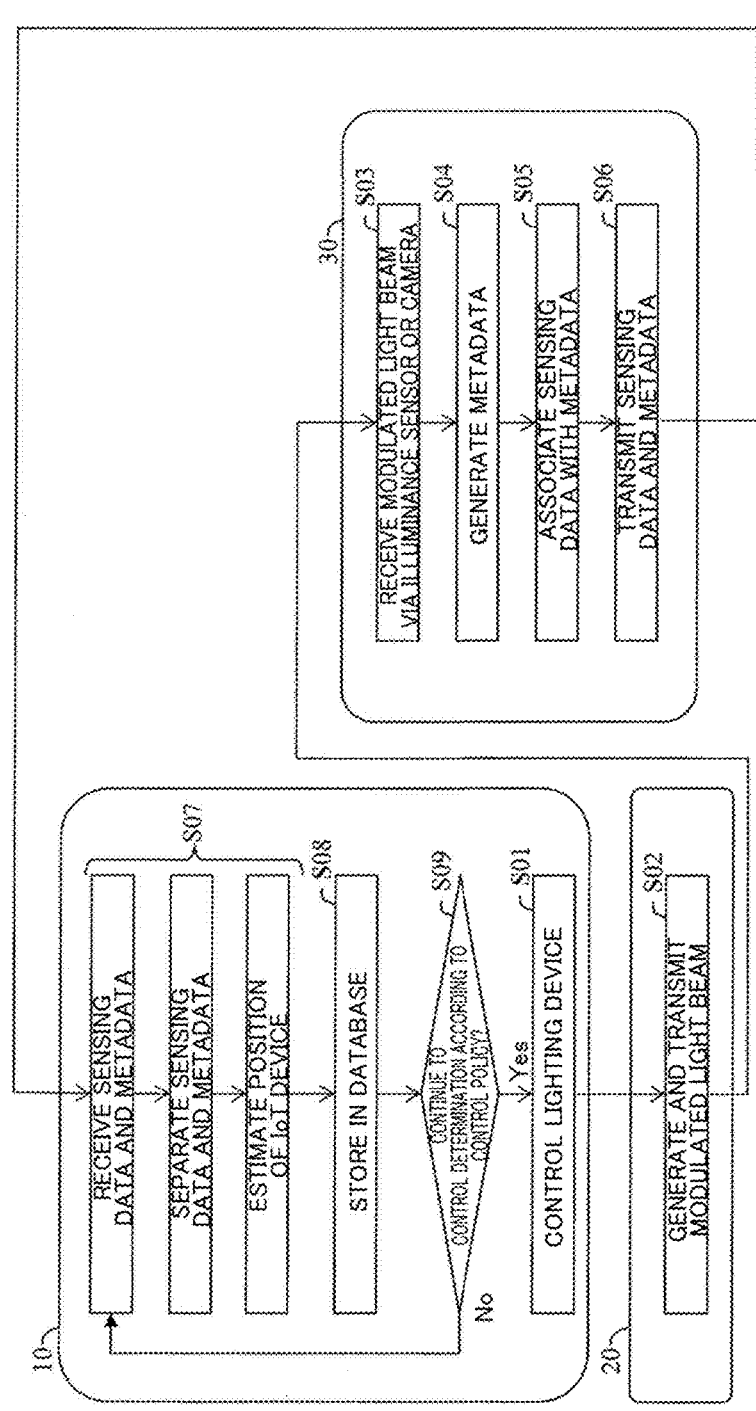
FIG. 2 is a diagram illustrating a control method according to the present invention.

FIG. 2 is a diagram illustrating a control method of the communication system 301. The control method includes controlling generation and output of modulated light beams to the lighting devices 20 (step S01), outputting the modulated light beams that are modulated from the lighting devices 20 (step S02), receiving each of the modulated light beams by the IoT device 30 (step S03), using information obtained from each of the modulated light beams by the IoT device 30 as metadata Dm (step S04), and transmitting the metadata Dm and collected sensing data Ds in association with each other from the IoT device 30 (steps S05 and S06), estimating a position of the IoT device 30 from the metadata Dm by the control device 10 (step S07), and storing the position of the IoT device 30 and the sensing data Ds in association with each other by the control device 10 (Step S08).

Each device will be described in detail. The lighting device 20 receives an instruction to generate and output a modulated light beam from the control device 10 via a network 50. Although there are three lighting devices 20 in FIG. 1, the number is not limited to three as long as there are a plurality of lighting devices. The lighting device 20 is a room light, preferably a dimmable LED light source that outputs white or incandescent light. The lighting device 20 transmits a specific light modulation pattern at a degree of modulation or a modulation period that cannot be perceived by a person. Each of the lighting devices 20 transmits light of different light modulation patterns and modulation periods.

Figure 3:
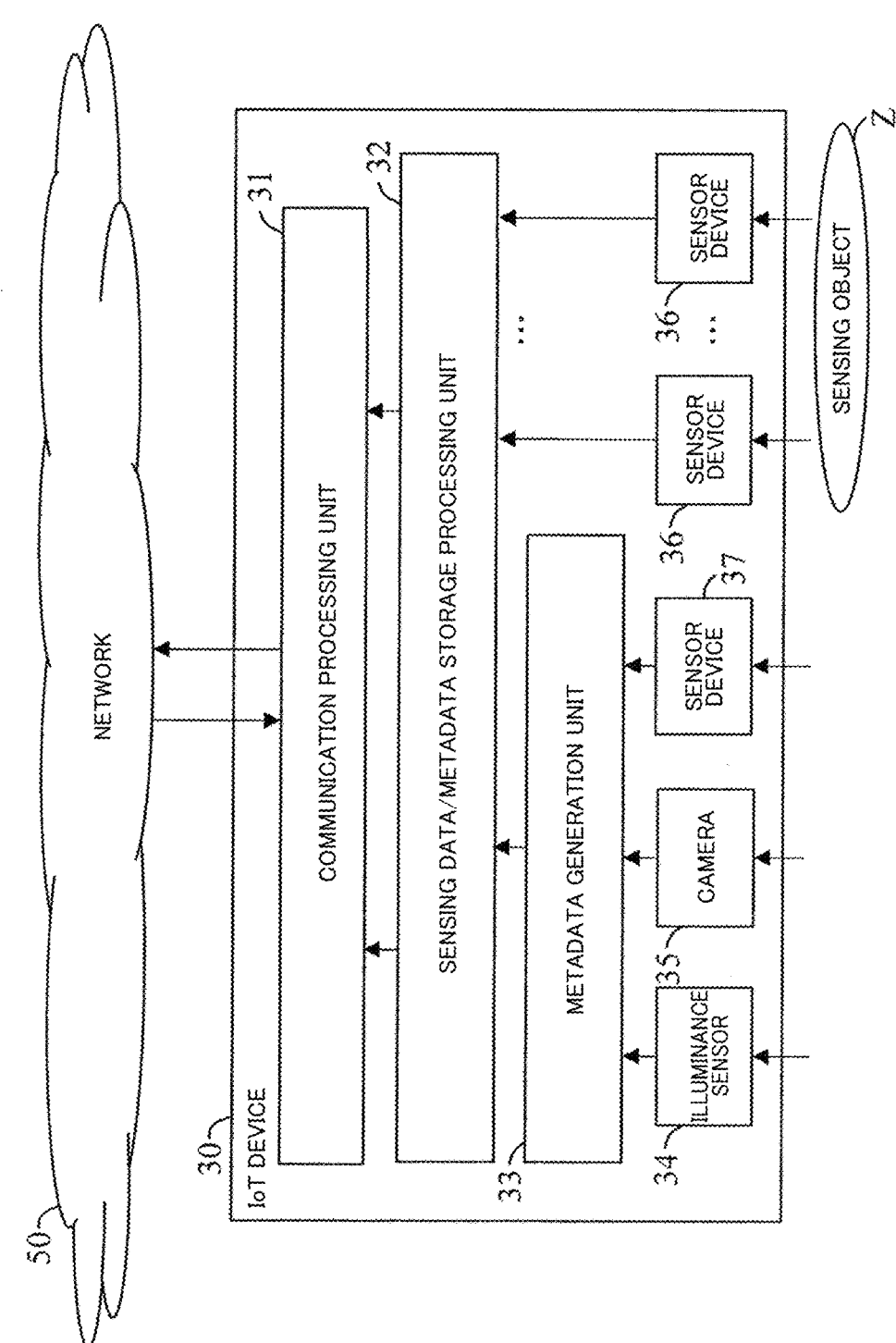
FIG. 3 is a diagram illustrating an IoT device of the communication system according to the present invention.

FIG. 3 is a diagram illustrating the IoT device 30. The IoT device 30 includes a communication processing unit 31, a sensing data/metadata storage processing unit 32, a metadata generation unit 33, and a sensor device 36. The IoT device 30 includes at least one of an illuminance sensor 34 and a camera 35.

The sensor device 36 is one or more. The sensor device 36 measures data of a sensing object Z such as temperature and humidity in order to periodically transmit the data to a host server. The sensor device 36 inputs the measured sensing data to the sensing data/metadata storage processing unit 32.

The illuminance sensor 34 or the camera 35 receives the modulated light beam from the lighting device 20. The metadata generation unit 33 generates position metadata Dm for assisting position estimation of the IoT device 30 from a signal of the received modulated light beam. The metadata Dm is, for example, data of a frequency of the received modulated light beam, a received signal intensity, or a 1/0 received pattern divided at arbitrary time intervals.

The sensing data/metadata storage processing unit 32 stores the metadata Dm generated by the metadata generation unit 33 and sensing data Ds generated by the sensor device 36 in a predetermined area of a frame. For example, the metadata Dm and the like can be stored in a specific extension area of a control system frame. The storage method is described in the appendix. Also, the metadata Dm and the like may be stored in a payload area of a data frame of L3 or more similarly to the sensing data Ds. Here, the sensing data Ds and the metadata Dm may be associated with each other by, for example, time information acquired from the sensing data Ds and the metadata Dm.

Specific Example

When the sensing data Ds and the metadata Dm are stored in a specific extension area of a control system frame, The generated flag information wireless communication protocol may be stored in the specific extension area of the control system frame.

In order to conform to the format/restrictions of the specific extension area, the data may be converted into a certain shortened code, divided into a plurality of frames (fragmentation), or stored after being processed.

Storage timing: Each time data is updated, it may be stored sequentially, or records (logs) after accumulating for a certain period of time, or results of specific calculations/statistical processing may be stored.

Metadata to be stored may be stored after being encrypted using an encryption key preset on the terminal side.

The communication processing unit 31 transmits a frame storing the sensing data Ds and the metadata Dm to the control device 10 via the network 50. The sensing data Ds and the metadata Dm may be stored in different frames, and each frame may be transmitted to a gateway 51 using different protocols, or may be transmitted to the gateway 51 using the same protocol. Also, the respective frames may be transmitted from the gateway 51 to the control device 10 using different protocols or the same protocol.

That is, the IoT device 30 stores the metadata Dm, which is information related to a reception pattern from the lighting device 20 received via the illuminance sensor 34 or the camera 35, in a frame in association with the sensing data Ds, and transmits the frame to the control device 10. Here, the association of both is exemplified by giving time information to both (identified by time) or giving the same header or the like at the time of data encapsulation (identified by header).

Figure 4:
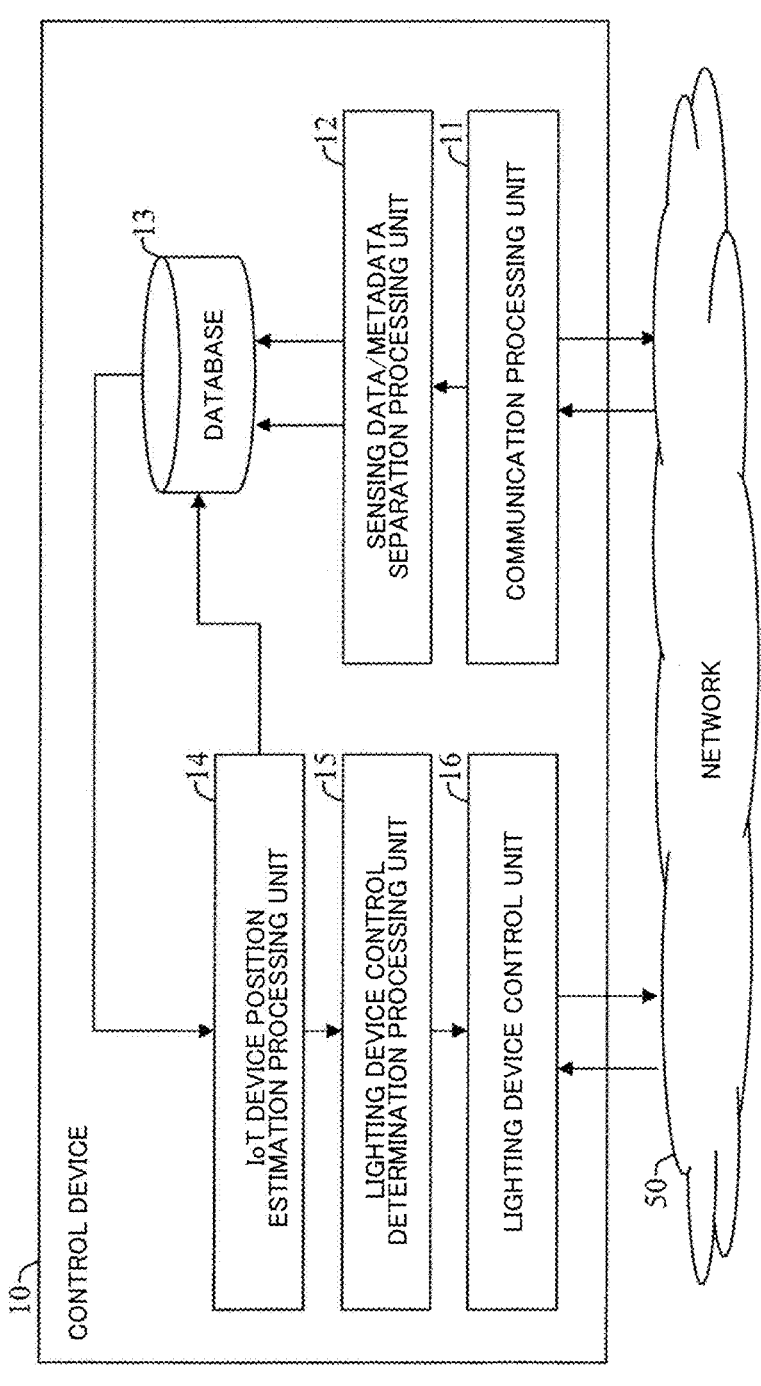
FIG. 4 is a diagram illustrating a control device of the communication system according to the present invention.

FIG. 4 is a diagram illustrating the control device 10. The control device 10 includes a communication processing unit 11, a sensing data/metadata separation processing unit 12, a database 13, an IoT device position estimation processing unit 14, a lighting device control determination processing unit 15, and a lighting device control unit 16.

The communication processing unit 11 receives a frame storing the sensing data Ds and the metadata Dm transmitted from the IoT device 30 via the network 50.

The sensing data/metadata separation processing unit 12 extracts the sensing data Ds and the metadata Dm from the frame received by the communication processing unit 11, separates them, and stores them in the database 13. The sensing data/metadata separation processing unit 12 also stores time information when the communication processing unit 11 receives the frame together with the sensing data Ds and the metadata Dm in the database 13.

The IoT device position estimation processing unit 14 estimates the position of the IoT device 30 using the metadata Dm out of the sensing data Ds and the metadata Dm stored in the database 13. Any method may be used as a position estimation method performed by the IoT device position estimation processing unit 14. For example, it is simply estimated as follows.

The transmission period of the light pattern is set to a different value for each lighting device 20. The position of the lighting device 20 has been ascertained in advance. The IoT device position estimation processing unit 14 acquires a period and intensity of the light pattern received by the IoT device 30 from the metadata Dm. The IoT device position estimation processing unit 14 can specify the lighting device 20 that has transmitted the light pattern from the period of the light pattern. The IoT device position estimation processing unit 14 can estimate a distance between the IoT device 30 and the lighting device 20 from the intensity of the light pattern. The IoT device position estimation processing unit 14 estimates the position of the IoT device 30 using distances from at least two lighting devices 20.

The IoT device position estimation processing unit 14 associates the position estimation result with the sensing data Ds using reception time information and stores them in the database 13.

The lighting device control determination processing unit 15 selects the lighting device 20 to be controlled next, and transmits a control instruction to the lighting device control unit 16. The lighting device control determination processing unit 15 determines whether or not to continue to control the lighting device 20 further according to a control policy of the lighting device 20. For example, when the control policy is defined by repeating the position estimation processing n times (n is a natural number) in advance, the lighting device control determination processing unit 15 functions as a counter.

The lighting device control unit 16 controls the lighting device 20 under its control according to instructions from the lighting device control determination processing unit 15. Specifically, the lighting device control unit 16 sets an exclusive light pattern, a period, or a degree of modulation for the lighting device 20 under its control.

That is, the control device 10 acquires the sensing data Ds and the metadata Dm, and estimates a position (a position of the IoT device 30) where the sensing data Ds is acquired by using the metadata Dm. The control device 10 sets the estimated position with the sensing data Ds and stores it in the database 13. The control device 10 controls the period, degree of modulation, and the like of the light pattern transmitted by each lighting device 20 according to the control policy in order to periodically collect the position information of the IoT device 30.

Embodiment 2

The control device 10 can also be implemented by a computer and a program, and the program can be recorded in a recording medium or provided through a network.

Figure 5:
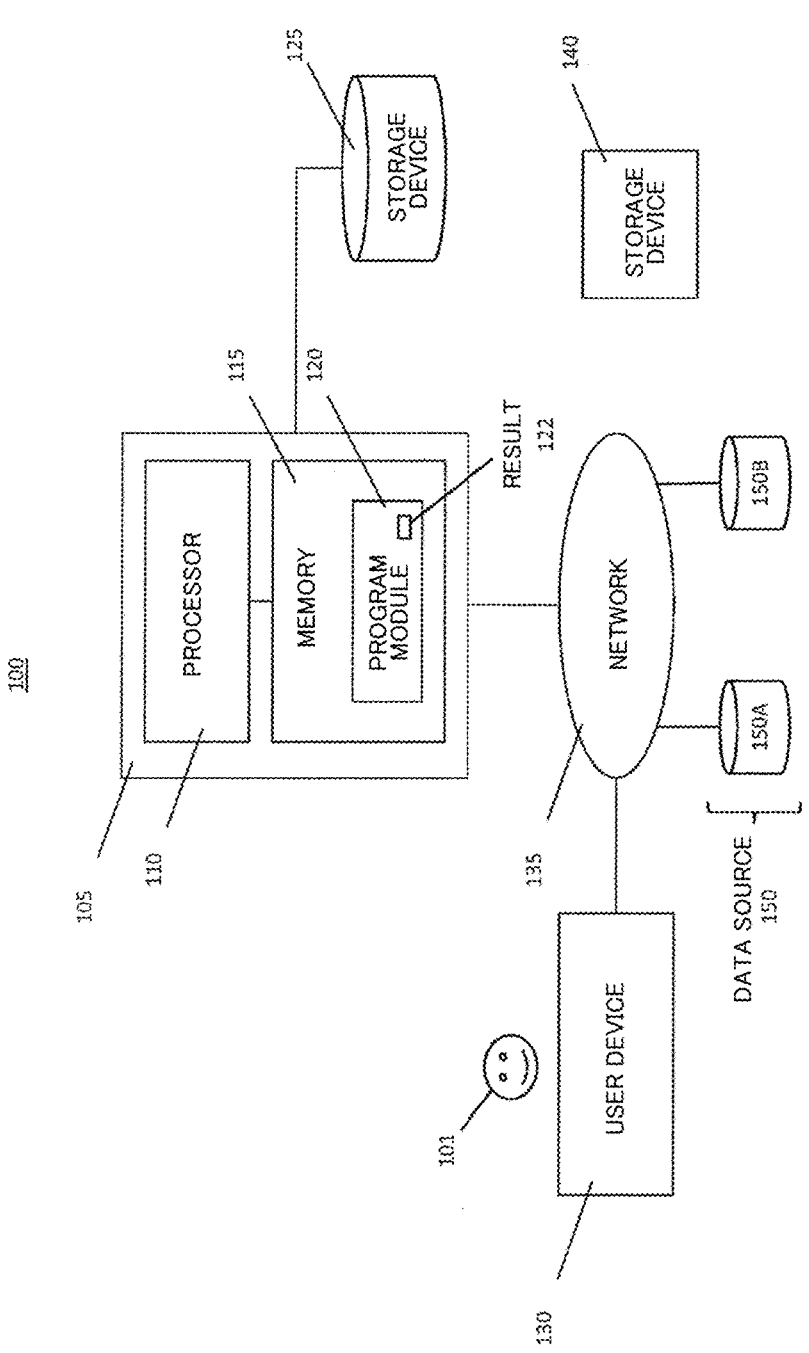
FIG. 5 is a diagram illustrating a communication system according to the present invention.

FIG. 5 illustrates a block diagram of a system 100. The system 100 includes a computer 105 connected to a network 135.

The network 135 is a data communication network. The network 135 may be a private network or a public network, and may include any or all of (a) a personal area network, for example, covering a room, (b) a local area network, for example, covering a building, (c) a campus area network, for example, covering a campus, (d) a metropolitan area network, for example, covering a city, (e) a wide area network, for example, covering an area connected across boundaries of cities, rural areas, or countries, and (f) the Internet. Communication is performed by an electronic signal and an optical signal via the network 135.

The computer 105 includes a processor 110 and a memory 115 connected to the processor 110. In the present specification, the computer 105 is represented as a standalone device. On the other hand, the computer is not limited thereto, and may be connected to other devices (not illustrated) in a distributed processing system.

The processor 110 is an electronic device including a logic circuitry that responds to a command and executes the command.

The memory 115 is a tangible computer-readable storage medium in which a computer program is encoded. In this regard, the memory 115 stores data and commands, that is, program codes, that are readable and executable by the processor 110 to control operation of the processor 110. The memory 115 can be implemented by a random access memory (RAM), a hard drive, a read-only memory (ROM), or a combination thereof. One of the components of the memory 115 is a program module 120.

The program module 120 includes commands for controlling the processor 110 to perform processes described in the present specification. In the present specification, although it is described that operation is executed by the computer 105, a method, a process, or a sub-process thereof, the operation is actually executed by the processor 110.

In the present specification, the term "module" is used to refer to functional operation that may be embodied one of as a stand-alone component or as an integrated configuration of a plurality of sub-components. Thus, the program module 120 can be implemented as a single module or as a plurality of modules that operate in cooperation with each other. Further, in the present specification, although the program module 120 is described as being installed in the memory 115 and thus implemented in software, the program module 120 can be implemented in any of hardware (for example, an electronic circuit), firmware, software, or a combination thereof.

Although the program module 120 is illustrated as already being loaded into the memory 115, the program module 120 may be configured to be provided on a storage device 140 so as to be subsequently loaded into the memory 115. The storage device 140 is a tangible computer-readable storage medium that stores the program module 120. Examples of the storage device 140 include a compact disk, a magnetic tape, a read-only memory, an optical storage medium, a hard drive or a memory unit including a plurality of parallel hard drives, and a universal serial bus (USB) flash drive. Alternatively, the storage device 140 may be a random access memory or another type of electronic storage device provided in a remote storage system (not illustrated) and connected to the computer 105 via the network 135.

The system 100 further includes a data source 150A and a data source 150B which are collectively referred to herein as a data source 150 and are communicatively connected to the network 135. In practice, the data source 150 may include any number of data sources, that is, one or more data sources. The data source 150 may include unstructured data and may include social media.

The system 100 further includes a user device 130 operated by a user 101 and connected to the computer 105 via the network 135. Examples of the user device 130 include an input device, such as a keyboard or a voice recognition subsystem, for enabling the user 101 to input information and command selections to the processor 110. The user device 130 further includes an output device such as a display device, a printer, or a speech synthesizer. A cursor control unit such as a mouse, a trackball, or a touch-sensitive screen allows the user 101 to manipulate a cursor on the display device to input further information and command selections to the processor 110.

The processor 110 outputs a result 122 of execution of the program module 120 to the user device 130. Alternatively, the processor 110 can provide the output to a storage device 125 such as a database or a memory or to a remote device (not illustrated) via the network 135.

For example, a program that performs processing illustrated in the flowchart of FIG. 2 (steps S01 and S07 to S09) may be used as the program module 120. The system 100 can be operated as the control device 10.

The term "include . . . " or "including . . . " specifies that the mentioned features, integers, steps, or components are present, but should be understood as not excluding the presence of one or more other features, integers, steps, or components, or groups thereof. The terms "a" and "an" are indefinite articles for an object and therefore do not exclude embodiments including a plurality of objects.

Other Embodiments

Note that the present invention is not limited to the above embodiments, and various modifications can be made without departing from the gist of the present invention. In short, the present invention is not limited to the upper embodiments as they are, and can be embodied by modifying components in the practical phase without departing from the gist thereof.

In addition, various inventions can be made by appropriately combining a plurality of components disclosed in the above embodiments. For example, some components of all the components shown in the embodiment may be omitted. Further, constituent elements in different embodiments may be appropriately combined.

APPENDIX

A method of storing the metadata Dm and the like in the specific extension area of the control system frame will be described.

(Method 1) When the communication protocol of the network 50 employs LLDP or HTIP, the method disclosed in International Publication WO2021/166260 or the method described with reference to FIGS. 6 and 7 can be employed.

Figure 6:
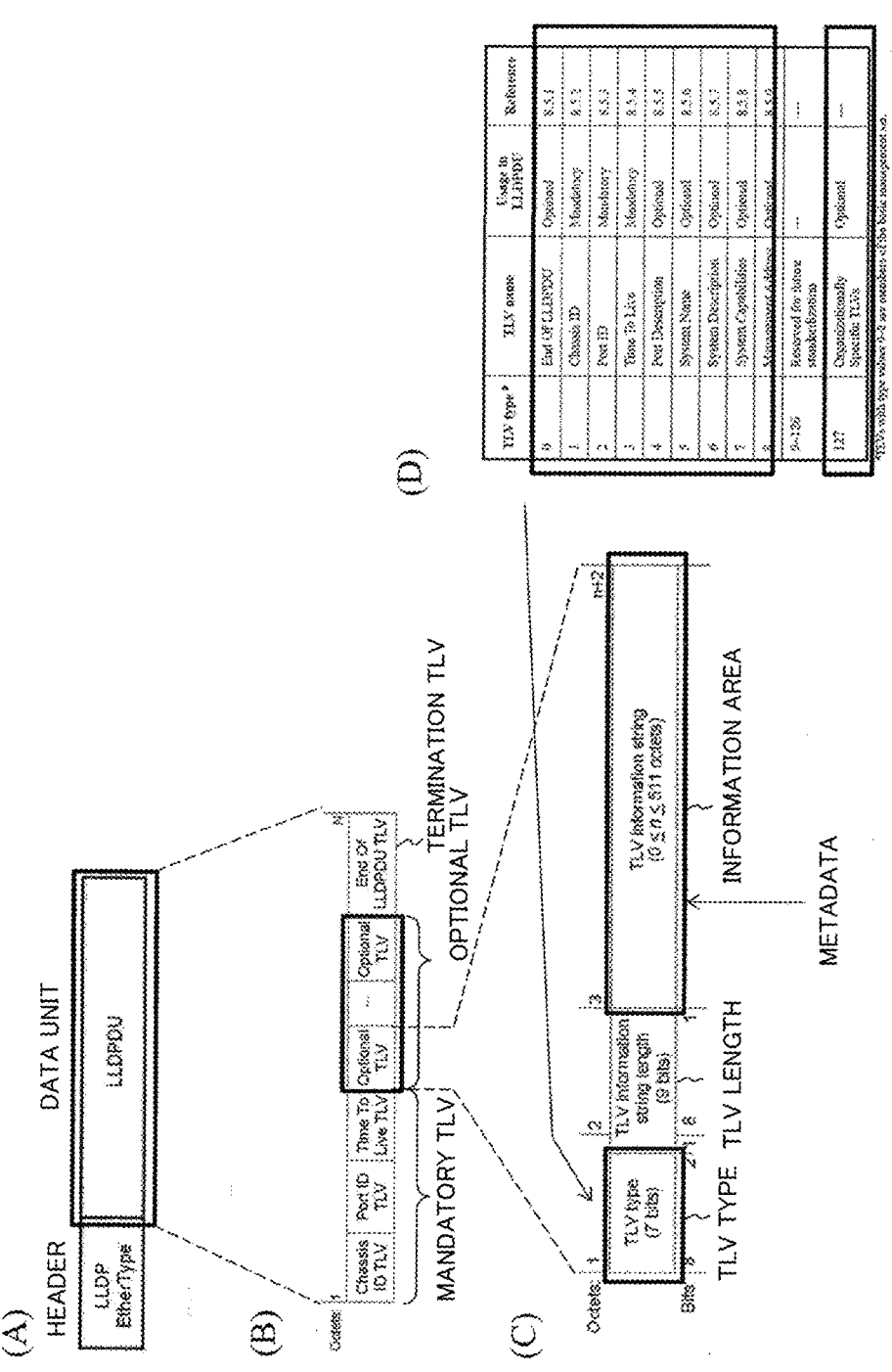
FIG. 6 is a diagram illustrating an example of storing metadata in an LLDP frame.

FIG. 6 is a diagram illustrating an example of storing the device information and metadata in a frame when LLDP (Reference 1) is employed as a communication protocol. FIG. 6(A) is a diagram illustrating a frame configuration of LLDP. A frame of LLDP is composed of a header and a data unit. FIG. 6(B) is a diagram illustrating a format of the data unit. The data unit is composed of a mandatory TLV, an optional TLV, and a termination TLV. FIG. 6(C) is a diagram illustrating a format of one optional TLV. The optional TLV is composed of a TLV type, a TLV length, and an information area. FIG. 6(D) is a list of types of optional TLV. When "1" to "8" are entered in the TLV type, various types of information such as device name, manufacturer name, MAC address, or IP address can be stored as device information in the information area of the optional TLV. Also, when "127" is entered in the TLV type, the information area of the optional TLV becomes an extension area, and metadata can be stored therein. Thus, in addition to sensing data and device information, it is possible to collectively collect metadata regarding the normality of the device.

[Reference 1] IEEE Std 802.1AB-2016, "IEEE Standard for Local and Metropolitan Area Networks-Station and Media Access Control Connectivity Discovery"

Figure 7:
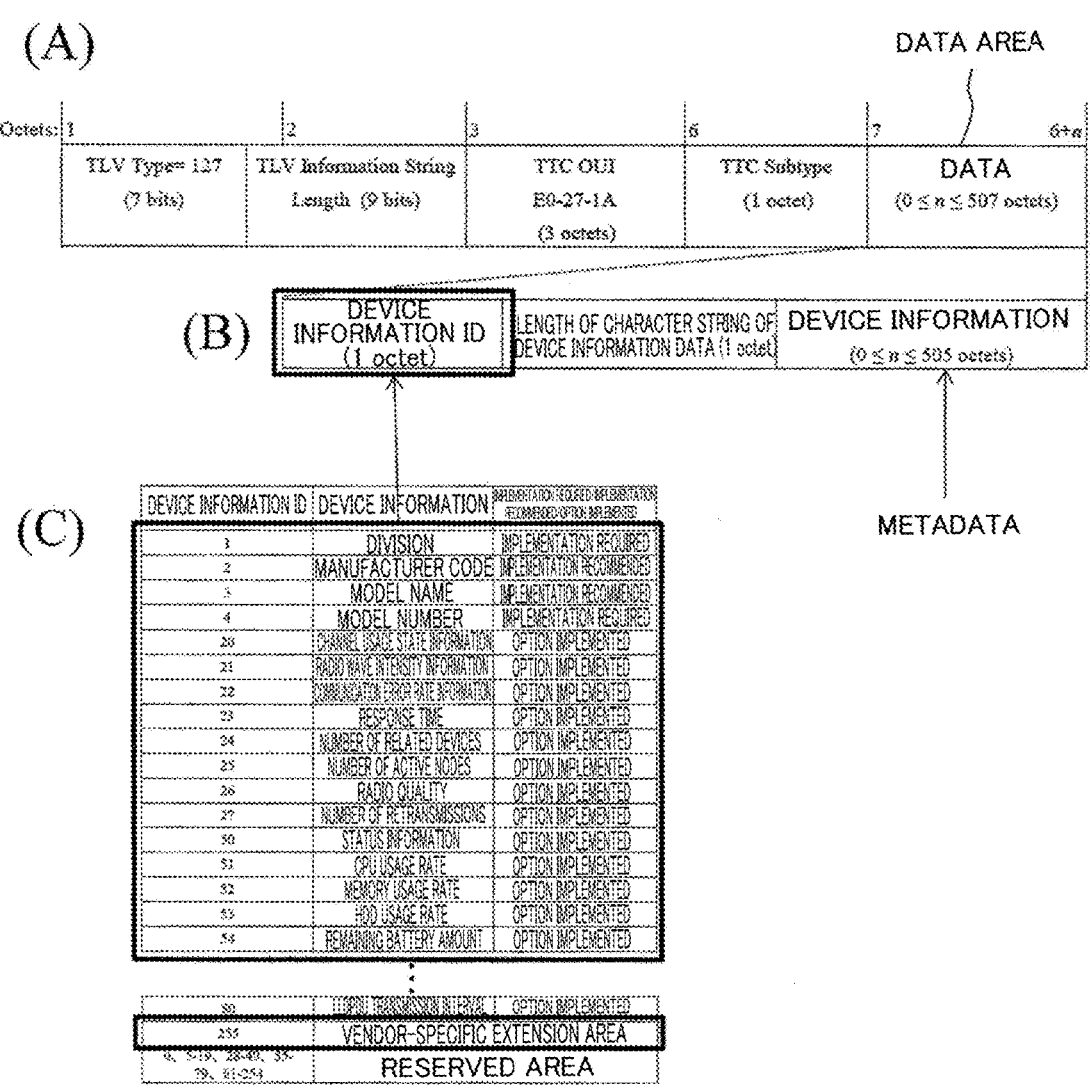
FIG. 7 is a diagram illustrating an example of storing metadata in an HTIP frame.

FIG. 7 is a diagram illustrating an example of storing the device information and metadata in a frame when HTIP (Reference 2) is employed as a communication protocol. FIG. 7(A) is a diagram illustrating a frame configuration of HTIP. A frame of HTIP is composed of an area describing the TLV type and length and a data area. FIG. 7(B) is a diagram illustrating a format of the data area. The data area is composed of a device information ID, a device information data length, and device information. FIG. 7(C) is a list of device information IDs. When "1" to "4," "20" to "27," and "50" to "54" are entered in the device information ID, various types of information such as device name, manufacturer name, MAC address, or IP address can be stored as device information in the device information area of the data area. Also, when "255" is entered in the device information ID, the device information area of the data area becomes a vendor-specific extension area, and metadata can be stored therein. Thus, in addition to sensing data and device information, it is possible to collectively collect metadata regarding the normality of the device. So far, examples of metadata storage in the extension area/option area of LLDP and HTIP have been given as examples, but not limited to these, and other communication standards such as Wi-Fi, LPWA, and PON may be used as long as the communication functions/protocols are provided by the sensor terminal 11.

[Reference 2] TTC Standard JJ-300.00, "HTTP: Home-Network Topology Identifying Protocol Version 3.0," May 25, 2017

(Method 2) When the network 50 is an IEEE802.11 wireless LAN, metadata is stored in the area in the control system frame illustrated in FIG. 8. FIG. 8(A) shows an example in which the control system frame is a probe request frame. Metadata is stored in the "Vendor Specific" area EXP. FIG. 8(B) shows an example in which the control system frame is a probe response frame. Metadata is stored in the "Vendor Specific" area EXP. The source of FIG. 8 is as follows.

IEEE Std 802.11-2016, p. 708-712,
IEEE Standard for Information Technology.
Local and Metropolitan Area Networks.
Specific Requirements,
Part 11: Wireless LAN MAC and PHY Specifications

REFERENCE SIGNS LIST

10 Control device
11 Communication processing unit
12 Sensing data/metadata separation processing unit
13 Database
14 IoT device position estimation processing unit
15 Lighting device control determination processing unit
16 Lighting device control unit
20, 20-1, 20-2, 20-3 Lighting device
30 IoT device
31 Communication processing unit
32 Sensing data/metadata storage processing unit
33 Metadata generation unit
34 Illuminance sensor
35 Camera
36 Sensor device
37 Sensor device
50 Network
51 Gateway
100 System
101 User
105 Computer
110 Processor
115 Memory
120 Program module
122 Result
125 Storage device
130 User device
135 Network
140 Storage device
150 Data source

The invention claimed is:
1. A communication system comprising:
a control device;
a plurality of lighting devices; and
an Internet of Things (IoT) device, wherein the lighting devices are configured to output modulated light beams that are modulated, the IoT device is configured to receive each of the modulated light beams, use information obtained from each of the modulated light beams as metadata, and transmit, to the control device, the metadata and collected sensing data in association with each other, and the control device is configured to control generation and output of the modulated light beams to the lighting devices, estimate a position of the

IoT device from the metadata, and store the position of the IoT device and the sensing data in association with each other.

2. The communication system according to claim 1, wherein the control device is configured to output the modulated light beams different for each of the lighting devices, estimate a distance between each of the lighting devices and the IoT device from a light intensity of each of the modulated light beams received by the IoT device, and estimate the position of the IoT device from the distance.

3. A control device that controls a communication system including a plurality of lighting devices and an Internet of Things (IoT) device, wherein the lighting devices are configured to output modulated light beams that are modulated, the IoT device is configured to receive each of the modulated light beams, use information obtained from each of the modulated light beams as metadata, and transmit the metadata and collected sensing data in association with each other, and the control device is configured to control generation and output of the modulated light beams to the lighting devices, estimate a position of the IoT device from the metadata received from the IoT device, and store the position of the IoT device and the sensing data in association with each other.

4. The control device according to claim 3, wherein control device is configured to output the modulated light beams different for each of the lighting devices, estimate a distance between each of the lighting devices and the IoT device from a light intensity of each of the modulated light beams received by the IoT device, and estimate the position of the IoT device from the distance.

5. A control method for controlling a communication system including a plurality of lighting devices and an Internet of Things (IoT) device, the method comprising:

outputting modulated light beams that are modulated from the lighting devices;

receiving each of the modulated light beams by the IoT device;

using information obtained from each of the modulated light beams by the IoT device as metadata, and transmitting the metadata and collected sensing data in association with each other from the IoT device;

controlling generation and output of the modulated light beams to the lighting devices;

estimating a position of the IoT device from the metadata; and storing the position of the IoT device and the sensing data in association with each other.

6. The control method according to claim 5, wherein the modulated light beam is different for each of the lighting devices, and the control method further comprises estimating a distance between each of the lighting devices and the IoT device from a light intensity of each of the modulated light beams received by the IoT device, and estimating the position of the IoT device from the distance.

* * * * *